United States Patent
Lee et al.

(10) Patent No.: US 8,252,849 B2
(45) Date of Patent: Aug. 28, 2012

(54) COATING AGENT FOR POLY(METHYL METHACRYLATE) PANEL NANO IMPRINTING AND METHODS OF USE

(75) Inventors: Choon Soo Lee, Seoul (KR); Min Hee Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 170 days.

(21) Appl. No.: 12/751,486

(22) Filed: Mar. 31, 2010

(65) Prior Publication Data

US 2011/0130483 A1    Jun. 2, 2011

(30) Foreign Application Priority Data

Nov. 27, 2009 (KR) ........................ 10-2009-0116002

(51) Int. Cl.
*C08F 2/50* (2006.01)
*C08J 3/28* (2006.01)

(52) U.S. Cl. .............. 522/182; 522/71; 522/74; 522/75; 522/104; 522/107; 522/113; 522/114; 522/120; 522/121; 522/152; 522/181; 428/411.1; 428/500

(58) Field of Classification Search .................. 522/113, 522/114, 120, 121, 152, 178, 181, 71, 74, 522/75, 104, 107; 428/411.1, 500
See application file for complete search history.

(56) References Cited

U.S. PATENT DOCUMENTS

| | | | |
|---|---|---|---|
| 7,375,144 B2 * | 5/2008 | Gilmer ........................... 522/92 |
| 7,576,139 B2 * | 8/2009 | Sugiura et al. ................ 522/107 |
| 7,601,765 B2 * | 10/2009 | Rink et al. .................... 522/153 |
| 7,732,506 B2 * | 6/2010 | Wang et al. ................... 522/179 |
| 7,902,267 B2 * | 3/2011 | Sugiura et al. ................ 522/107 |
| 7,915,320 B2 * | 3/2011 | Sugiura et al. ................ 522/109 |
| 2011/0003909 A1 * | 1/2011 | Fujita et al. .................. 522/182 |

FOREIGN PATENT DOCUMENTS

| | | |
|---|---|---|
| JP | 07-092303 A | 4/1995 |
| JP | 2006-130841 A | 5/2006 |
| JP | 2008-260273 A | 10/2008 |
| KR | 10-0600623 | 7/2006 |
| KR | 10-0616221 | 8/2006 |
| KR | 10-0710735 | 3/2007 |
| KR | 10-2008-0024475 | 3/2008 |
| WO | WO 2009110496 A1 * | 9/2009 |

OTHER PUBLICATIONS

Tinuvin 400 Liquid UV Absorber for Coatings—Description Manual from Ciba (1994). [online]. [Retrieved on Nov. 3, 2011]. From the internet:<URL:http://www.tri-iso.com/SiteAdmin/Portals/0/12_292_Tinuvin%020400.pdf>.*
Dow Corning 190 Fluid—Product Information Sheet from Dow Corning (2010). [online]. [Retrieved on Nov. 3, 2011]. From the internet:<URL:http://www.dowcorning.com/applications/search/default.aspx?R=5631EN>.*
LS-292 (UV-292) product sheet from Eonian Enterprise-Sinochem Jiangsu Corporation (2011). [online]. [Retrieved on Nov. 3, 2011]. From the Internet:<URL: http://www.worldmarketsrl.com/pdf/EON/Filtros%20Solares2/HALS/LS-292.pdf>.*
Tinuvin 123-Hindered Aminoether Light Stabilizer for Coatings from Ciba (1994). [online]. [Retreived on Nov. 2, 2011]. From the Internet: <URL: http://www.tri-iso.com/SiteAdmin/Portals/0/12_285_Tinuvin%20123.pdf>.*
BNX-1035 Product Data Sheet from Mayzo (2010). [online]. [ retrieved on Nov. 3, 2011]. from the Internet URL:<:from the Internet: http://www.mayzo.com/pdf/BNX1035.pdf>.*

* cited by examiner

*Primary Examiner* — Sanza McClendon
(74) *Attorney, Agent, or Firm* — Edwards Wildman Palmer LLP; Peter F. Corless

(57) ABSTRACT

Disclosed is a coating agent for poly(methyl methacrylate) (PMMA) panel nano imprinting, more particularly, a coating agent for PMMA panel nano imprinting comprising a UV curable resin, a photoinitiator, an additive for surface modification and a weather-resistant stabilizer.

7 Claims, No Drawings

COATING AGENT FOR POLY(METHYL METHACRYLATE) PANEL NANO IMPRINTING AND METHODS OF USE

CROSS-REFERENCE(S) TO RELATED APPLICATIONS

This application claims under 35 U.S.C. §119(a) the benefit of Korean Patent Application No. 10-2009-0116002, filed on Nov. 27, 2009, the entire contents of which is incorporated herein by reference.

BACKGROUND OF THE INVENTION

1. Field of the Invention

The present invention relates, generally, to a coating agent for poly(methyl methacrylate) (PMMA) panel nano imprinting. Particularly, the coating agent described by the present invention preferably has a suitably superior anti-reflective property, comprising a UV curable resin, a photoinitiator, a solvent-free additive for suitable surface modification and a weather-resistant stabilizer.

2. Description of Related Art

Generally, in an automobile, an automobile instrument cluster is mounted at a location where most light comes in from the outside. The light reflected from the instrument cluster may interfere with the driver's vision thus making the driver feel very uncomfortable.

Accordingly, either a cluster cover has been provided to block the incoming light or the cluster is provided deep inside and aided by a curved cluster window. However, such structural modification decreases degree of freedom of interior design and thus is not a preferable solution.

Nano imprinting technique was proposed in the late 1990s by Professor Stephen Y. Chou at Princeton University. Nano imprinting has been reported as a technique that is suitable to be used in place of electron beam lithography technique or expensive optical lithography technique that can be less productive and expensive. The nano imprinting technique enables formation of repetitive nanopatterns on a polymer film without etching using a nanostructure-imprinted stamp. Thus, it is widely used in the IT industries, including optical devices, semiconductors, displays, etc. When the nano imprinting technique is suitably applied to a flat panel display panel or an automobile instrument cluster window, degradation of visibility caused by reflection of light may be overcome. In addition, degree of freedom of design may also be improved. However, until now, the technique has not been applied to automobile parts. Since existing polymer resins for nanopatterning were developed for electrical and electronic devices, they do not attach well to poly(methyl methacrylate) (PMMA) resin, the material that automobile instrument cluster windows are made, and do not enable pattern formation or cannot meet the requirements of automobile interiors.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention is directed to a UV curable resin having a refractive index similar to that of poly(methyl methacrylate) (PMMA), the material of which the automobile instrument cluster window is made, and can suitably minimize light reflection on the automobile instrument cluster.

The present invention also describes a preferred composition to satisfy the requirements of automobile interiors.

Accordingly, an object of the present invention is to provide a suitable coating agent for PMMA panel nano imprinting having superior anti-reflective property.

In certain preferred aspects, the present invention provides a coating agent for PMMA panel nano imprinting, preferably including: (1) a UV curable resin comprising one or more selected from the group consisting of a monomer, an oligomer and a prepolymer having one or more functional group(s) having polymerizable unsaturated bond(s); (2) a photoinitiator; (3) a solvent-free additive for surface modification; and (4) a weather-resistant stabilizer.

In certain preferred embodiments, the coating agent for PMMA panel nano imprinting of the present invention enables suitable formation of nanopatterns with improved transmittance as well as light resistance, heat resistance and scratch resistance meeting the requirements for automobile interiors. Further, with superior anti-reflective property with light reflectance not greater than 4%, of the present invention may preferably overcome the degradation of visibility caused by reflection of light. In certain preferred embodiments, since a solvent-free additive is preferably used for surface modification, the change in refractive index or the variation of refractive index that is caused by the solvent remaining without being evaporated during drying of the coating layer (film) may be suitably prevented.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

DETAILED DESCRIPTION

The advantages, features and aspects of the invention will become apparent from the following description of the embodiments.

As described herein, the present invention includes a coating agent for poly(methyl methacrylate) panel nano imprinting, comprising a UV curable resin, a photoinitiator, a solvent-free additive for surface modification, and a weather-resistant stabilizer.

In one preferred embodiment, the UV curable resin comprises one or more of a monomer, an oligomer and a prepolymer.

In another preferred embodiment, the monomer, an oligomer and a prepolymer have one or more functional group(s) having polymerizable unsaturated bond(s) selected from acryloyl, methacryloyl, acryloyloxy, methacryloyloxy, epoxy and vinylether.

The invention also features an automobile instrument cluster comprising the coating agent for poly(methyl methacrylate) panel nano imprinting according to any one of the above aspects.

In preferred aspects, the present invention provides a coating agent for PMMA panel nano imprinting, including: (1) a UV curable resin comprising one or more selected from the group consisting of a monomer, an oligomer and a prepolymer having one or more functional group(s) having polymerizable unsaturated bond(s); (2) a photoinitiator; (3) a solvent-free additive for suitable surface modification; and (4) a weather-resistant stabilizer.

Preferably, in certain embodiments of the present invention, the UV curable resin is one or more selected from the group consisting of a monomer, an oligomer and a prepolymer having one or more functional group(s) having polymerizable unsaturated bond(s), which has a refractive index similar to that of poly(methyl methacrylate) (PMMA), the material of which the automobile instrument cluster window is made. In further preferred embodiments, the functional group having polymerizable unsaturated bond(s) may be one or more selected from the group consisting of, but not only limited to, acryloyl, methacryloyl, acryloyloxy, methacryloyloxy, epoxy and vinylether. In particular preferred embodiments, the UV curable resin may be one or more selected from i) one or more monomer(s) selected from a group consisting of, but not only limited to, dipentaerythritol hexaacrylate, trimethylpropane triacrylate, methyl methacrylate, methoxypolyethylene methacrylate, cyclohexyl methacrylate, phenoxyethyl methacrylate, ethylene glycol dimethacrylate, trimethylolpropane trimethacrylate and 1,6-hexanediol diacrylate; ii) an oligomer prepared by polymerizing the monomers(s); and iii) a prepolymer prepared by polymerizing the monomers(s).

Preferably, in further embodiments, the UV curable resin is used in an amount of 78 to 99 wt %, more preferably 80 to 95 wt %, based on the total weight of the coating agent. Preferably, if the UV curable resin is used less than 78 wt %, film formation may be suitably insufficient and surface property may be suitably degraded. In further related embodiments, if the UV curable resin is used in an amount exceeding 99 wt %, surface property may be suitably degraded because the contents of other additives is suitably low.

According to further preferred embodiments of the present invention, the photoinitiator initiates curing of the coating agent. Preferably, the photoinitiator may be one commonly used in the art and is not particularly limited. In certain preferred embodiments, the photoinitiator may preferably be one or more selected from the group consisting of, but not limited only to, 1-hydroxycyclohexyl phenyl ketone, 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, and 1-(4-isopropylphenyl)-2-hydroxy-2-methylpropan-1-one. Preferably, the photoinitiator is used in an amount of 0.1 to 15 wt %, more preferably 0.1 to 10 wt %, based on the total weight of the coating agent. In related embodiments, if the photoinititator is used less than 0.1 wt %, the coating agent may not be suitably cured because radical is not formed by the photoinitiator. In other related embodiments, if it is used more than 15 wt %, storage stability of the coating agent may be suitably degraded because of excessive radical reaction.

According to preferred exemplary embodiments of the present invention, the solvent-free additive for surface modification helps complete transfer of a film to a transparent substrate during a procedure of suitably pressing the coating agent on the substrate using a nano-imprinting stamp, performing UV curing and then detaching the nano-imprinting stamp. In certain preferred embodiments, preferably, the additive for surface modification may be a silicone-based additive for surface modification. In certain exemplary embodiments, specific examples may include, but are not limited only to, one or more silicone-based additive(s) selected from BYK-347, BYK-348, BYK-349, BYK-307, BYK-333, BYK-337 and BYK-378, which are available from BYK. In further embodiments, an additive without including a solvent (organic solvent) is preferred. Preferably, the additive for surface modification is used in an amount of 0.1 to 2 wt %, more preferably 0.1 to 0.5 wt %, based on the total weight of the coating agent. In further related embodiments, if it is used less than 0.1 wt %, it may be suitably difficult to transfer the film from the stamp to the substrate. In other related embodiments, if it is used more than 2 wt %, surface property may be suitably degraded.

In certain preferred exemplary embodiments of the present invention, the weather-resistant stabilizer prevents suitable deformation of the film formed on the PMMA substrate by the coating agent by absorbing UV. Preferably, it may comprise one or more of a UV absorber and a UV stabilizer. In certain exemplary embodiments, the UV absorber may be a benzotriazole-based UV absorber, preferably a phenylbenzotriazole-based UV absorber, more preferably one or more selected from the group consisting of TINUVIN 171, TINUVIN 328, TINUVIN 384, TINUVIN 400 and TINUVIN 1130, which are available from Ciba Specialty Chemicals. In other exemplary embodiments, preferably, the UV stabilizer may be a hindered amine light stabilizer (HALS), more preferably one or more HALS selected from TINUVIN 123, TINUVIN 152 and TINUVIN 292, which are available from Ciba Specialty Chemicals. Preferably, the weather-resistant stabilizer is used in an amount of 0.5 to 5 wt %, more preferably 0.5 to 2 wt %, based on the total weight of the coating agent. In further related embodiments, if the weather-resistant stabilizer is used less than 0.5 wt %, the film may experience yellowing upon UV radiation. In other related embodiments, if it is used more than 5 wt %, the film surface may be suitable unstable.

According to preferred embodiments of the present invention as described herein, the coating agent for PMMA panel nano imprinting of the present invention has considerably superior anti-reflective property, with a light reflectance not greater than 4%, more preferably 1 to 4. Accordingly, an automobile instrument cluster window coated with the coating agent of the present invention is suitably without degradation of visibility caused by reflection of light.

EXAMPLES

The following examples are for illustrative purposes only and not intended to limit the scope of the present invention.

Examples 1 to 5 and Comparative Examples 1 and 2

According to certain exemplary embodiments of the present invention, coating agents for poly(methyl methacrylate) (PMMA) panel nano imprinting were suitably prepared with the compositions and contents shown in Table 1, below. After dropping an adequate amount of each coating agent onto a nano-imprinting stamp and covering with a PMMA sheet, which is used to make a cluster window material, the sheet was rubbed well using a roller to prevent formation of air bubbles. Then, after UV radiation, the nano-imprinting stamp was detached to form a film having a nano-imprinted pattern on the PMMA substrate.

TABLE 1

|  |  | Ex. 1 | Ex. 2 | Ex. 3 | Ex. 4 | Ex. 5 | Comp. Ex. 1 | Comp. Ex. 2 |
|---|---|---|---|---|---|---|---|---|
| UV curable resin | 1,6-Hexanediol diacrylate[1] | 40.0 | 40.0 | 31.0 | 93.7 | — | 44.7 | — |
|  | Dipentaerythritol hexaacrylate[2] | 53.7 | 52.7 | 62.7 | — | 95 | 50.3 | — |
| Photoinitiator | 1-Hydroxycyclohexyl phenyl ketone[3] | 5.0 | 5.0 | 5.0 | 5.0 | 4.0 | 5.0 | — |
| Additive for surface modification[4] |  | 0.3 | 0.3 | 0.3 | 0.3 | 0.3 | — | — |
| Weather-resistant stabilizer[5] |  | 1.0 | 2.0 | 1.0 | 1.0 | 0.7 | — | — |
| Substrate |  | PMMA | PMMA | PMMA | PMMA | PMMA | PMMA | PMMA |
| Nano imprinting |  | Yes | Yes | Yes | Yes | Yes | Yes | No |

[1] 1,6-Hexanediol diacrylate: Miramer M-200 (Miwon Specialty Chemical)
[2] Dipentaerythritol hexaacrylate: Miramer M-600 (Miwon Specialty Chemical)
[3] 1-Hydroxycyclohexyl phenyl ketone: Irgacure 184 (Ciba-Geigy)
[4] Additive for surface modification: solvent-free additive BYK-378 (BYK)
[5] Weather-resistant stabilizer: TINUVIN 400 (Ciba Specialty Chemicals)

Test Example

Test of Films on Physical Property and Light Reflectance

A film was coated on a PMMA sample using each of the coating agents for PMMA panel nano imprinting of Examples 1 to 5 and Comparative Examples 1 and 2. Physical properties and light reflectance of the film were tested as follows.

(1) Adhesivity at room temperature: Cross-cuts were made on the test sample by making 11 cuts horizontally and vertically with 2 mm intervals. After clearing the surface using a soft brush, an adhesive tape with adequate width and length was firmly attached. Then, the tape was pulled strongly at an angle of 90° and the number of detached lattices was counted. Preferably, a larger number out of the total 100 lattices means worse adhesivity.

(2) Releasability: After UV radiation, followed by detachment of the nano-imprinting stamp, the transfer of the film to the transparent substrate was observed. Preferably, releasability was evaluated as follows.
① A: All the film was transferred to the transparent substrate.
② B: 75% or more of the film was transferred to the transparent substrate.
③ C: 50 to 75% of the film was transferred to the transparent substrate.
④ D: 50% or less of the film was transferred to the transparent substrate.

(3) Heat resistance: After keeping the test sample at 80° C. for 300 hours, followed by keeping at room temperature for 1 hour, adhesivity test and discoloring observation were done immediately.

(4) Light resistance: After light irradiation at 700 mJ/cm$^2$ under xenon atmosphere for 15 days, the test sample was suitably cleaned using a neutral detergent solution. Then, after drying with air, followed by keeping at room temperature for 1 hour, adhesivity test and discoloring observation were done.

(5) Wear resistance: Wear resistance was tested using a reciprocating wear tester at a load of 1 kgf using an abrasive for 10,000 times. In the event the coating was removed, the test was stopped and the number tested by then was recorded.

(6) Light reflectance: Light reflectance was measured by transmitting visible light in the region of 300 to 800 nm.

TABLE 2

|  | Adhesivity at room temperature | Releasability | Heat resistance (Δb) | Light resistance (Δb) | Wear resistance (number) | Reflectance (%) |
|---|---|---|---|---|---|---|
| Ex. 1 | 100/100 | A | 0.06 | 0.14 | 10,000 | 2.23 |
| Ex. 2 | 100/100 | A | 0.04 | 0.09 | 10,000 | 3.98 |
| Ex. 3 | 100/100 | A | 0.14 | 0.19 | 8,000 | 2.72 |
| Ex. 4 | 100/100 | A | 0.12 | 0.20 | 6,700 | 3.56 |
| Ex. 5 | 100/100 | A | 0.10 | 0.18 | 7,100 | 3.15 |
| Comp. Ex. 1 | 100/100 | B | 0.22 | 0.49 | 5,000 | 5.10 |
| Comp. Ex. 2 | — | — | 0.19 | 0.50 | 4,500 | 9.20 |

As shown in Table 2, above, the PMMA panel samples to which the coating agents for nano imprinting of the present invention, were shown to meet the requirements of automobile interiors, including surface heat resistance, light resistance and wear resistance. In addition, due to the effective nano-sized protrusions formed by the nano imprinting, they exhibited superior anti-reflective property with the light reflectance not greater than 4%. Therefore, the coating agent for PMMA panel nano imprinting of the present invention will be useful as a coating agent for film formation of an automobile instrument panel, particularly an automobile instrument cluster window.

While the present invention has been described with respect to the specific embodiments, it will be apparent to those skilled in the art that various changes and modifications may be made without departing from the spirit and scope of the invention as defined in the following claims.

What is claimed is:

1. A coating agent for poly(methyl methacrylate) panel nano imprinting, comprising:
   a UV curable resin obtained by polymerizing (i) 1,6-hexandiol diacrylate in an amount of 0 to 93.7 weight % based on coating agent weight and (ii) dipentaerythritol hexaaxrylate in an amount of 0 to 95 weight % based on coating agent weight, with the resin comprising one or both of polymerized 1,6-hexandiol diacrylate or dipentaervthritol hexaacrylate units;
   a photoinitiator comprising 1 hydroxycyclohexyl phenyl ketone;
   a solvent-free additive for surface modification; and
   a weather-resistant stabilizer.

2. The coating agent for poly(methyl methacrylate) panel nano imprinting according to claim 1, which comprises: 78 to 99 wt % of the UV curable resin; 0.1 to 15 wt % of the photoinitiator; 0.1 to 2 wt % of the additive for surface modification; and 0.5 to 5 wt % of the weather-resistant stabilizer.

3. The coating agent for poly(methyl methacrylate) panel nano imprinting according to claim 1, wherein the weather-resistant stabilizer is one or more selected from the group consisting of a benzotriazole-based UV absorber and a hindered amine light stabilizer (HALS)-based UV stabilizer.

4. The coating agent for poly(methyl methacrylate) panel nano imprinting according to claim 1, which has a light reflectance of 1 to 4%.

5. An automobile instrument cluster comprising the coating agent for poly(methyl methacrylate) panel nano imprinting according to claim 1.

6. An automobile instrument cluster comprising a coating agent for poly(methyl methacrylate) panel nano imprinting, the coating agent comprising:
   a UV curable resin obtained by polymerizing (i) 1,6-hexandiol diacrylate in an amount of 0 to 93.7 weight % based on coating agent weight and (ii) dipentaerythritol hexaacrylate in an amount of 0 to 95 weight % based on coating agent weight, with the resin comprising polymerized 1,6-hexandiol diacrylate or dipentaerythritol hexaaxrylate units;
   a photoinitiator comprising 1 hydroxycyclohexyl phenyl ketone;
   a solvent-free additive for surface modification; and
   a weather-resistant stabilizer selected from the group consisting of a benzotriazole-based UV absorber and a hindered amine light stabilizer (HALS)-based UV stabilizer,
   wherein the coating agent comprises 78 to 99 wt % of the UV curable resin; 0.1 to 15 wt % of the photoinitiator; 0.1 to 2 wt % of the additive for surface modification; and 0.5 to 5 wt % of the weather-resistant stabilizer.

7. The automobile instrument cluster of claim 6 wherein the coating agent exhibits a light reflectance of 1 to 4%.

* * * * *